(12) United States Patent  
Moushegian et al.

(10) Patent No.: US 7,240,949 B1
(45) Date of Patent: Jul. 10, 2007

(54) ADJUSTABLE SEAT ASSEMBLY

(75) Inventors: Mark T Moushegian, San Diego, CA (US); Stuart P Macey, Carlsbad, CA (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 11/364,126

(22) Filed: Feb. 28, 2006

(51) Int. Cl.
 *B60N 2/02* (2006.01)
(52) U.S. Cl. .................................... 296/65.01
(58) Field of Classification Search ............... 296/63, 296/64, 65.01, 66, 65.05, 65.09, 65.13, 65.16, 296/69
 See application file for complete search history.

(56) References Cited

U.S. PATENT DOCUMENTS

| | | | |
|---|---|---|---|
| 4,655,503 A | | 4/1987 | Kamijo et al. |
| 5,868,451 A | * | 2/1999 | Uno et al. ................. 296/66 |
| 5,890,758 A | * | 4/1999 | Pone et al. ................ 297/15 |
| 6,279,982 B1 | | 8/2001 | Nishimura et al. |
| 6,869,138 B2 | * | 3/2005 | Rhodes et al. ............. 297/15 |
| 6,983,985 B2 | * | 1/2006 | McGowan et al. ......... 297/15 |
| 6,997,498 B2 | * | 2/2006 | Oyama .................. 296/65.05 |
| 2003/0098592 A1 | * | 5/2003 | Nygren et al. .......... 296/65.09 |
| 2004/0183329 A1 | * | 9/2004 | Macey et al. .......... 396/65.13 |

FOREIGN PATENT DOCUMENTS

FR 02735081 A1 12/1998

* cited by examiner

*Primary Examiner*—H Gutman
(74) *Attorney, Agent, or Firm*—Ralph E. Smith

(57) ABSTRACT

A seat assembly for a vehicle includes a slide carried by the vehicle and having a moveable portion, a seat carried by the moveable portion and including a seat bottom and a seat back pivotally connected together for movement between an open position and a folded position, and a pivot connector connected between the movable portion and the seat to permit pivoted movement of the seat relative to the slide. In one presently preferred implementation, the pivot connector is connected to the seat back and the entire seat may be pivoted about the pivot connector to move the seat relative to and preferably into a forward or a rearward area in the vehicle interior. The slide permits sliding or generally horizontal movement of the seat in the vehicle and the seat may be pivoted and/or moved into a variety of positions.

21 Claims, 6 Drawing Sheets

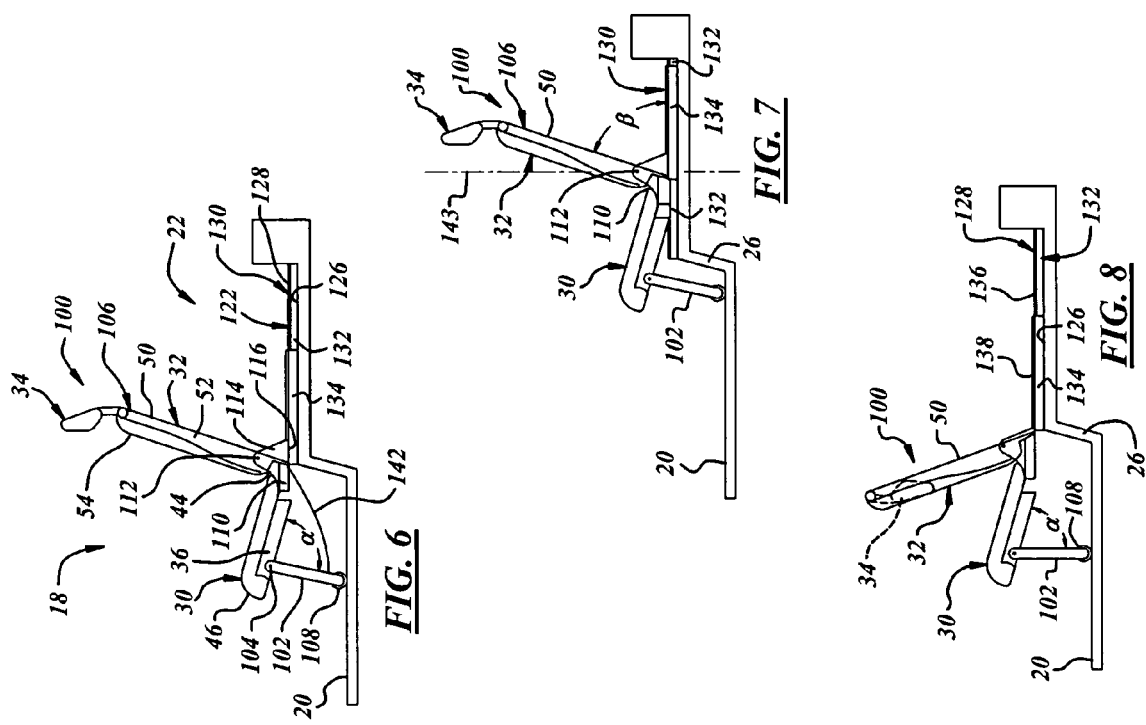

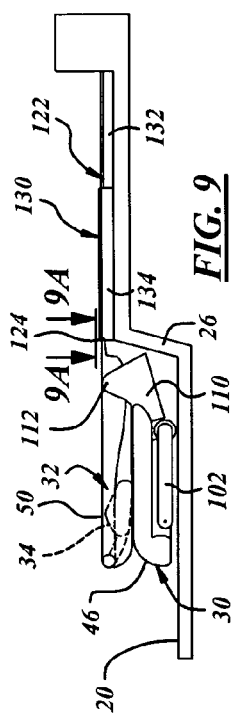
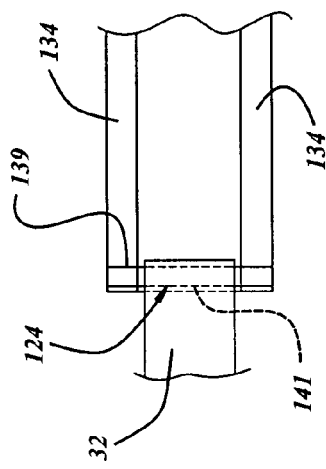
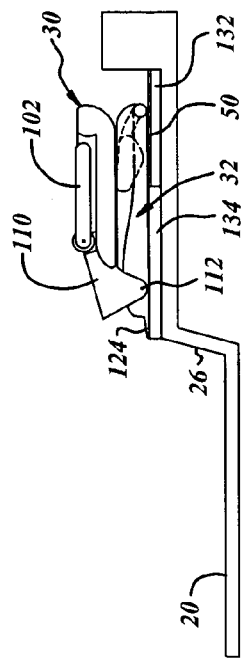
FIG. 9
FIG. 9A
FIG. 10

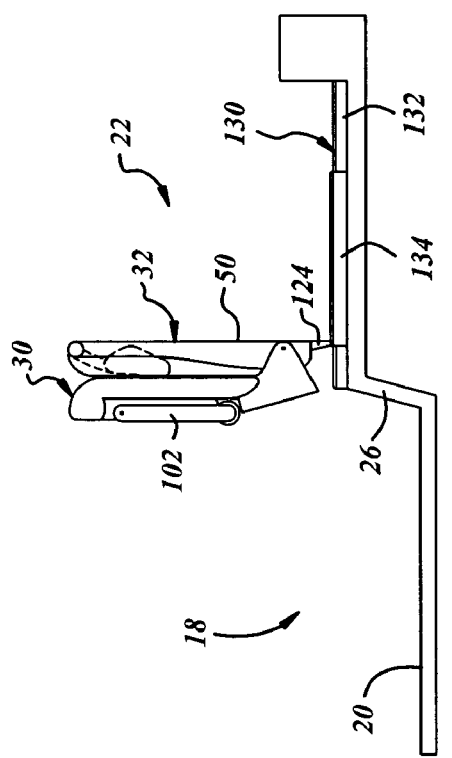
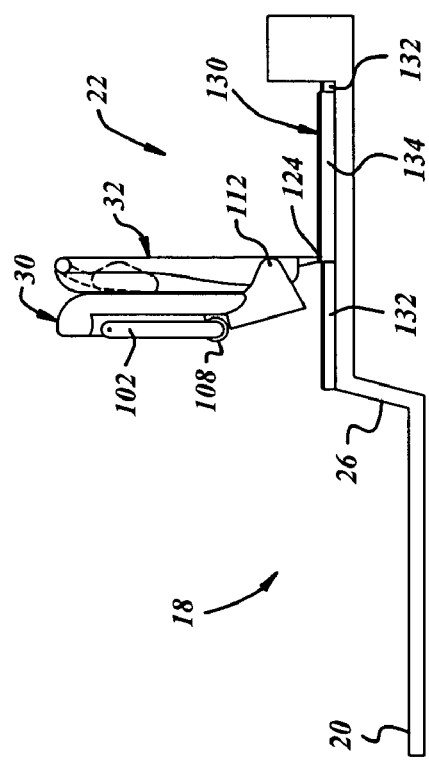

ADJUSTABLE SEAT ASSEMBLY

FIELD OF THE INVENTION

The present invention relates generally to adjustable seats and more particularly to adjustable seats for a vehicle.

BACKGROUND OF THE INVENTION

Passenger vehicles typically include a plurality of seats to receive and support vehicle occupants. The seats include a seat bottom or cushion, a seat back, and often a head rest attached to the seat back. The seat back may be pivoted relative to the seat bottom, and the entire seat may be slidably adjustable forward and rearward in the vehicle for increased passenger comfort. In some vehicles, the seat back may be folded flat against the seat cushion providing a horizontal surface in the vehicle. For example, in sport utility vehicles, seats in back rows of the vehicles may be folded flat so that the seat can become part of a cargo area of the vehicle when the seat is not in use.

SUMMARY OF THE INVENTION

A seat assembly for a vehicle includes a slide carried by the vehicle and having a moveable portion, a seat carried by the moveable portion and including a seat bottom and a seat back pivotally connected together for movement between an open position and a folded position, and a pivot connector connected between the movable portion and the seat to permit pivoted movement of the seat relative to the slide. In one presently preferred implementation, the pivot connector is connected to the seat back and the entire seat may be pivoted about the pivot connector to move the seat relative to and preferably into a forward or a rearward area in the vehicle interior. The slide permits at least forward and rearward movement of the seat in the vehicle and the seat may be pivoted and/or moved generally horizontally into a variety of positions.

In this manner, the seat can be moved forward and rearward with the slide to alter the position of the seat in the vehicle in most if not all of the positions of the seat. The seat preferably can be pivoted forward so that the seat bottom is adjacent to and flat against a floor of the vehicle interior and a rear side of the seat back is facing upwardly and preferably is generally flat or planar with a rearward cargo area of the vehicle. The seat also can be folded so that the seat back is generally flush against the seat back and then the folded seat can be pivoted rearward so that the seat is generally perpendicular to the rearward cargo area. The seat preferably can be further pivoted so that the seat is disposed in or on the cargo area and generally parallel to a surface of the cargo area.

In another implementation, the pivot connector is connected to the seat bottom and to the moveable portion of the slide. The entire seat may be pivoted about the pivot, preferably after the seat back has been folded flat against the seat bottom. The seat may be pivoted forward so that an underside of the seat bottom is facing upwardly and generally flat or planar with a rearward cargo area. The seat may also be folded flat and pivoted rearward so that it is at least partially, and preferably entirely, received in a cargo area or other rearward area of the vehicle.

BRIEF DESCRIPTION OF THE DRAWINGS

These and other objects, features and advantages of the present invention will be apparent from the following detailed description of preferred embodiments and the best mode, appended claims and accompanying drawings in which:

FIG. 6 is a side view of another embodiment of a seat assembly in an open and forward position;

FIG. 7 is a side view of the seat assembly of FIG. 6 in an open and rearward position;

FIG. 8 is a side view of the seat assembly in a forward and partially closed position;

FIG. 9 is a side view of the seat assembly in a closed and lowered position;

FIG. 9A is a plan view of the encircled portion 9A in FIG. 9 with a portion of a cover removed;

FIG. 10 is a side view of the seat assembly in a closed and rearward position;

FIG. 11 is a side view of the seat assembly in a closed and upward position providing a partition or bulkhead in the vehicle interior; and FIG. 12 is a side view of the seat assembly in a closed, upward and rearward position illustrating that the partition may be moved in the vehicle.

DETAILED DESCRIPTION OF PREFERRED EMBODIMENTS

Figure 1:
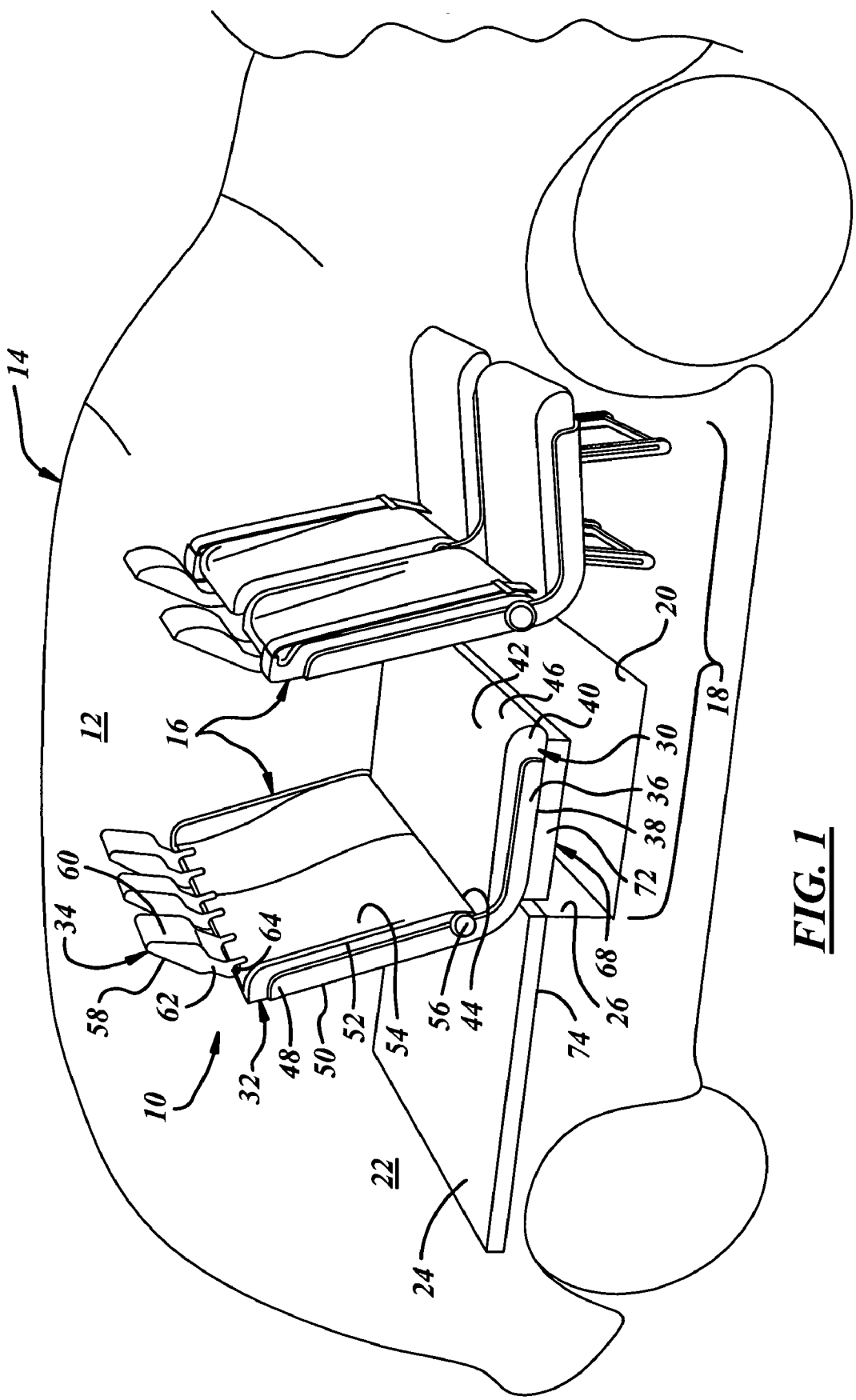
FIG. 1 is a perspective view of one presently preferred embodiment of a seat assembly in an interior of a vehicle.

Referring in more detail to the drawings, FIGS. 1-5 illustrate a first embodiment of a seat assembly 10 for an interior 12 of a vehicle 14 to retain occupants of the vehicle. As shown, the vehicle 14 includes two rows of seats 16, with each row including two separately movable and adjustable seat assemblies 10, although any arrangement and number of seats or rows of seats may be utilized. While the description herein will relate to one of the seat assemblies, it should be appreciated that any and all of the seat assemblies may be constructed as set forth herein.

The vehicle interior 12 includes a passenger compartment 18 in which the seats 16 normally are disposed, and the passenger compartment includes a floor 20 and an area forward of each seat to receive an occupant's legs. A rearward area or cargo area 22 is disposed behind the second row of seats and may be closed off from the passenger compartment 18 when the seats 16 in the second row are in their open positions. As best shown in FIG. 1, a floor 24 of the cargo area 22 may be raised above the passenger compartment floor 20 with a sidewall 26 extending between them. The cargo area 22 may be accessible from the exterior of the vehicle by, for example, a trunk lid or liftgate.

The seat assembly 10 includes a seat 16 that has a seat bottom 30, a seat back 32 pivotally connected to the seat bottom 30, and a head rest 34 pivotally connected to the seat back 32. The seat bottom 30 includes a structural frame 36 defining a lower surface 38 of the seat bottom 30 and a cushion 40 carried on the frame 36 and defining an upper surface 42 of the seat bottom 30. The seat bottom 30 also has a rearward end 44 adjacent the seat back 32 and a forward end 46 spaced therefrom.

The seat back 32 likewise includes a structural frame 48 that defines a rear surface 50 of the seat back 32 and a cushion 52 carried on the frame 48 and defining a forward surface 54 of the seat back 32. The seat back 32 is connected to the seat bottom 30 by a pivot 56, such as a shaft or trunnion type mount by way of examples without limitation. The seat back 32 is movable about the pivot 56 and relative to the seat bottom 30 to define an open position of the seat assembly 10 (FIG. 1) wherein the seat back 32 is generally perpendicular to the seat bottom 30, and a closed position of the seat assembly 10 (FIG. 3) wherein the seat back 32 is folded flat against and is generally parallel to the seat bottom 30.

The head rest 34 has a rear surface 58 and a forward facing cushion 60. The head rest 34 may include one or more arms 62 that are pivotally carried on a shaft (not shown) or other pivot 64 carried by the seat back 32 so that the head rest 34 can be rotated about its pivot. The head rest 34 is movable from an extended position wherein it may support the head of a vehicle occupant and a folded position wherein the headrest is folded generally flat against the seat back 32 with the forward facing cushion disposed against the inner surface 54 of the seat back 32.

Figure 2:
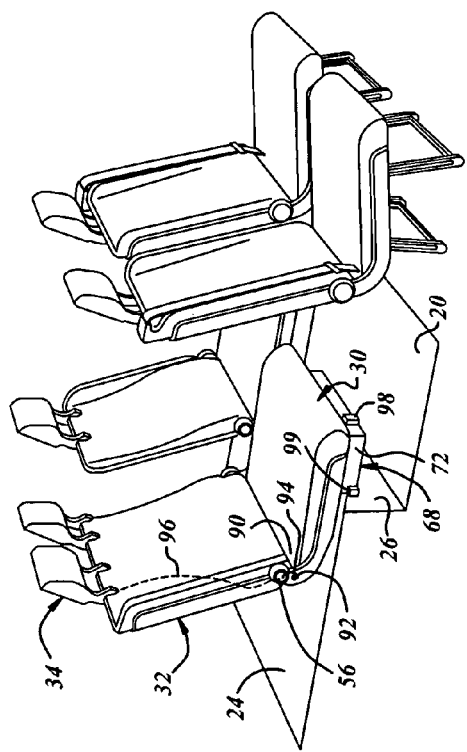
FIG. 2 is a perspective view of the seat assembly in an open and rearward position.
Figure 4:
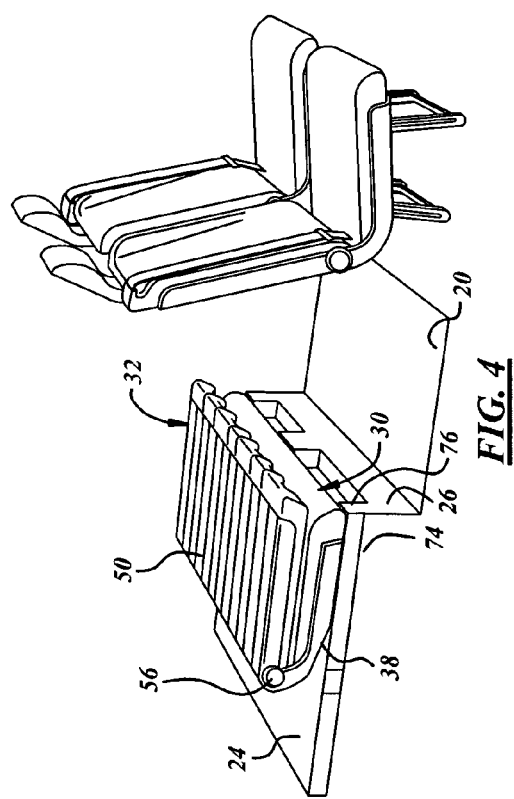
FIG. 4 is a perspective view of the seat assembly in a folded and rearward position.
Figure 5:
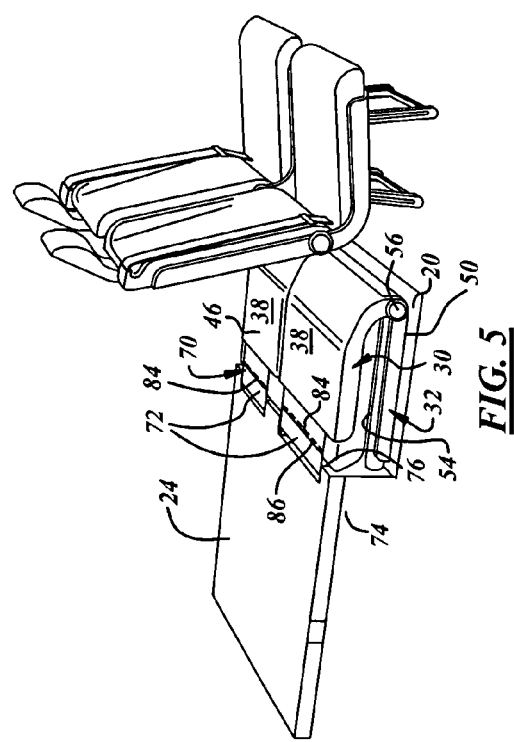
FIG. 5 is a perspective view of the seat assembly in a forward and lowered position.

As best shown in FIGS. 1 and 2, the seat assembly 10 is carried or retained in the vehicle 14 by a connection feature. The connection feature preferably includes a slide 68 and a pivot connector 70 (FIG. 5). The slide 68 includes a portion that is fixed against movement in the vehicle and a moveable portion that may be displaced relative to the fixed portion. The fixed portion may be an existing vehicle structure, it may be a structure added to the vehicle, or a combination of the two. In the implementation shown, the slide 68 includes a plate 72 that is constructed and arranged to permit translation or movement of the seat 16 between a forward position shown in FIG. 1 (toward the front of the vehicle) and rearward position as shown in FIG. 2 (toward the rear of the vehicle). The plate may be carried on one or more rails or linear bearings (not shown) that are in turn carried by the vehicle. The slide 68 may be disposed in a recess 74 under the cargo floor 24, and may extend outwardly from and move relative to the sidewall 26 via openings 76 as best shown in FIGS. 4 and 5.

Figure 3:
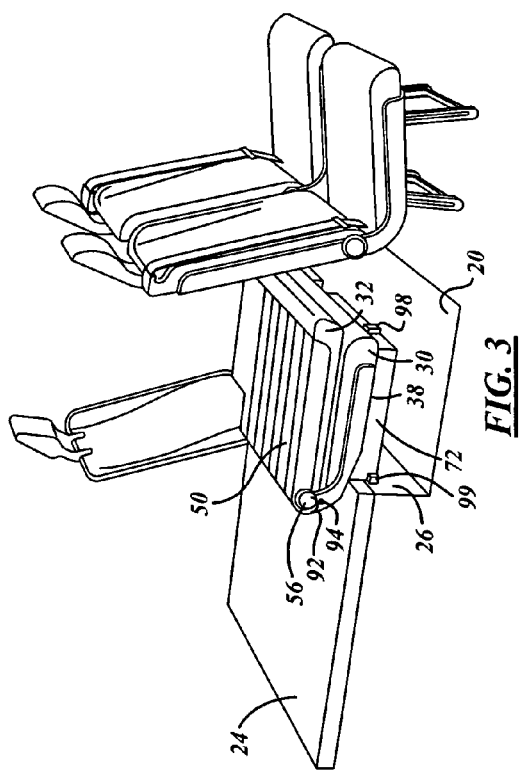
FIG. 3 is a perspective view of the seat assembly in a forward and folded position.

When applied to a seat 16 in the second row of seats, this permits the seat 16 to move closer to or further away from the first row of seats. In the implementation shown, this is true both when the seat 16 is in its open position (FIGS. 1 and 2) and its closed position (FIGS. 3 and 4). In its rearward position, the seat 16 may be received partially or entirely in the cargo area 22 of the vehicle with the seat bottom disposed adjacent to the cargo floor 24, as shown in FIG. 4.

As best shown in FIG. 5, the seat preferably is coupled to the slide by the pivot connector 70. In this embodiment, the pivot connector 70 is attached to a forward end of the plate 72 and to the forward end 46 of the seat bottom frame 36. The pivot connector 70 preferably includes a shaft 84 fixed at its ends to the slide 68 and a sleeve 86 disposed over the shaft 84 for rotation relative to the shaft and connected to the seat bottom frame 36. In this manner, the entire seat 16 may be pivoted about the pivot connector 70. When the seat 16 is in its closed position and positioned far enough rearward to clear the front row of seats or any other obstacle when the seat 16 is pivoted, the seat 16 may be fully pivoted forward and received against the floor 22. In this position, the lower surface 38 of the seat bottom faces upwardly and the rear surface 50 of the seat back 32 is disposed adjacent to the floor 20. In its closed position the seat preferably is as thick as the sidewall 26 is tall so that the lower surface 38 of the seat bottom 30 is generally flush with the cargo floor 24. This not only increases the effective size of the cargo area 22 by permitting a portion of the passenger compartment to more efficiently receive cargo, it also provides a generally flat floor for the entire cargo area.

Accordingly, the seat 16 can be moved forward and rearward to adjust the room between the seat and another object, such as a seat in another row of seats or the dashboard, by way of examples without limitation. The seat 16 can also be folded or pivoted between open and closed positions. And the seat 16 can be pivoted, for example, to be received in a folded and forward pivoted position wherein the seat 16 is received against the passenger compartment floor 20 and generally flush with an adjacent surface, such as a cargo floor 24. Seats 16 in adjacent rows may be folded flat, and pivoted if desired or necessary, so that the seats in adjacent rows define a generally flat or planar interior surface to increase the cargo area 22, or provide an open and generally flat area in which passengers may lie down. It is contemplated that all seats in a vehicle interior can be folded flat, and pivoted if needed in a particular design or arrangement, to provide a generally flat and open surface in the vehicle interior.

It may be necessary or desirable to lock the vehicle seat 16 in one or more of its various positions for convenience or safety reasons. The seat back 32 may be locked against pivoted movement relative to the seat bottom 30 to maintain the seat back 32 upright until such time as it is desired to fold the seat flat. As shown only in FIGS. 2 and 3, a lock 90 for doing so may be any desired mechanism, including by way of example without limitation, a latch 92 releasably engageable with a pin 94 or other stop surface. The latch 92 may be coupled to and disengaged from the pin 94 by a lever or switch, by way of examples without limitation. In one implementation, the head rest 34 acts as the lever and may be coupled to the lock 90 by a cable or other link 96 such that movement of the head rest 34 from its extended position sufficiently toward or into its folded position releases the latch 92 from the pin 94 and permits the seat back 32 to be pivoted relative to the seat bottom 30.

Likewise, it may be desirable to lock the pivot connector 70 to prevent unintended pivoting of the seat assembly about the pivot connector. Any suitable lock 98 (shown only in FIGS. 2 and 3) may be employed, including a latch and pin arrangement, or a pawl and ratchet wheel, by way of example with limitation. The lock 98 may be released by a lever carried by the seat 16. The lock 98 may also be coupled to the seat back 32 such that pivoted movement of the seat back 32 toward the seat bottom 30 releases the lock automatically without actuation of a lever, switch or other device.

It may also be desirable or necessary to lock the position of the slide 68 to prevent unintended forward or rearward movement of the seat 16. Any suitable lock 99 (shown only in FIGS. 2 and 3) may be used, and the lock may be operable in more than one position to permit releasably retaining the seat 16 in several positions. The lock 99 may be released by a lever, switch or any other suitable device.

FIGS. 6-12 illustrate a modified seat assembly 100 that can be moved, folded and/or pivoted into positions similar to the seat assembly 10. The following description of seat assembly 100 will focus primarily on the differences between this seat assembly 100 and the seat assembly 10.

For ease of description, similar parts will be given the same reference numbers used with reference to the seat assembly 10.

In this seat assembly 100, the seat bottom 30 is supported by a leg 102 connected to the seat bottom frame 36 at a leg pivot 104 disposed adjacent the forward end 46 of the seat bottom 30. The leg 102 may be pivoted relative to the seat bottom 30 from an extended position as shown in FIG. 6, to a retracted position folded flat against the seat bottom 30 as shown in FIG. 9. An acute included angle α between the leg 102 and the seat bottom 30 is preferably greater than 90 degrees when the leg is in its extended position and the seat 106 is positioned to receive a vehicle occupant. The leg 102 preferably includes a roller 108 adapted to engage the floor 20 to facilitate the sliding forward and rearward movement of the seat 106.

The seat bottom frame 36 includes a bracket 110 that is connected to a pivot 112 that in turn is connected to the seat back 32 so that the seat bottom 30 can be pivoted relative to the seat back 32. Accordingly, the seat bottom 30 is pivoted to the seat back 32 rather than a slide as in the seat assembly 10. The bracket 110 includes a stay 114 that has a stop surface 116 that is generally planar and adapted to engage a portion of a slide 122 when the seat 106 is in its open position to prevent pivoted movement of the seat bottom 30 toward the seat back 32 in normal use of the seat 106.

The seat 106 is adjustably carried in the vehicle by a connection feature that preferably includes the slide 122 and a pivot connector 124 (best shown in FIGS. 9-12) to permit sliding movement and pivoted movement of the seat 106. The slide 122 may be disposed on a bed 126 of the cargo area 22 and a cover 128 may be disposed over the slide 122 to define the cargo floor 130. In one implementation the slide 122 includes one or more fixed first rails 132 and one or more moveable second rails 134 that carry the seat 106 for movement relative to the fixed rails. As best shown in FIG. 8, so that the cover can accommodate such movement of the seat, the cover 128 may be split with a first cover portion 136 attached to the first rails 132 and a second cover portion 138 attached to the second rails 134 for movement therewith. Movement of the seat 106 between its forward position (FIG. 6) and rearward position (FIG. 7) will increasingly cover or uncover the first cover portion 136 depending on the direction of movement of the seat 106. Preferably, in all positions of the seat 106, the cover portions provide a generally flat cargo floor 130.

The pivot connector 124 preferably interconnects the seat back 32 and the moveable portion of the slide 122, which in the implementation shown includes the second rails 134. In this manner, the pivot connector 124 and the seat 106 move with the second rails as the seat 106 is moved forward and rearward. The pivot connector 124 permits the seat back 32 to pivot forward toward the passenger compartment floor 20 (see e.g. FIG. 9) and rearward toward the cargo floor 130 (see e.g. FIG. 10). The pivot connector 124 may be of any suitable construction including trunnion mounts, or a shaft fixed to the seat back 32 and rotatably carried by the slides 134, or as shown in FIG. 9A, a shaft 139 fixed to the slides and a sleeve 141 fixed to the seat back 32 and rotatably carried on the shaft 139, by way of examples without limitation.

To move the seat 106 from its open and forward position shown in FIG. 6 to its closed, forward and pivoted position shown FIG. 9 wherein the seat back 32 is generally flush with and provides a continuation of the cargo floor 130, the head rest 34 is pivoted to its folded position against the seat back (FIG. 8), and the seat back 32 is pivoted forward.

Pivoting of the seat back 32 slides the seat 106 forward until the stay 114 clears or is moved from the slide 122. Pivoting the seat back 32 preferably also pivots the leg 102 so that the included angle α is less than 90 degrees (FIG. 8) and the leg 102 may collapse to its folded position against the seat bottom 30. The leg 102 may be coupled to the seat back 32 by a link, such as a cable 142 (shown only in FIG. 6), so that the forward pivoting movement of the seat back 32 automatically pulls the leg 102 toward the seat bottom 30 to facilitate folding the seat 106. One way to accomplish this is to attach the cable 142 to the seat back at a location on the opposite side of the pivot 112 as the head rest 34 so that pivoted movement of the seat back as described tends to pull the leg 102 in the desired direction.

In this manner, the seat 106 may be moved to the position shown in FIG. 9 relatively easily, and preferably by simply further pivoting the seat back 32 toward the seat bottom 30 until the seat bottom 30 and the collapsed leg 102 are flat on the floor and the seat back 32 is folded flat against the seat bottom 30. As shown in FIG. 10, the folded flat or closed seat 106 can also be pivoted about the pivot connector 124 so that the seat 106 is entirely in the cargo area of the vehicle.

In the "normal" seating position of seat back 32 as shown in FIGS. 6 and 7, an angle β (FIG. 7) between the rear surface 50 of the seat back 32 and the cargo floor 130 is less than 90 degrees. Also, the seat back pivot 112 is spaced from and preferably disposed above the pivot connector 124. When the seat back 32 is pivoted forward, the seat back pivot 112 moves through an arc that passes through a plane 143 that intersects the axis of rotation of the pivot connector 124 and is perpendicular to the cargo floor. Accordingly, when the seat back 32 is pivoted forward, the pivot 112 and bracket 110 are moved sufficiently away from the slide 122 to permit the stay 114 to clear the slide 122. This permits the seat bottom 30 to be pivoted relative to the seat back 32 and the seat 106 to be moved to the position shown in FIG. 11. In this position, the seat 106 provides a partition or bulkhead between the cargo area 22 and the passenger compartment 18. As shown in FIGS. 11 and 12, the position of the partition, and hence the relative sizes of the cargo area 22 and passenger compartment 18, is adjustable by moving the seat 106 forward or rearward via the slide 122. Of course, the seat 106 can be releasably locked in any position, as desired.

The seats 16 and 106 preferably can be slidably moved a significant distance in the vehicle interior to increase the flexibility of the layout of the vehicle interior. Movement of the seats may increase the distance and usable area between rows of seats, may increase the cargo area of the vehicle, or otherwise permit adjustment and movement of the seats. The seats 16 and 106 can each be folded flat by pivoting the seat back and seat bottom together. The seats 16 and 106 can also be pivoted about their respective pivot connector 70 and 124 so that the seats are received in a forward area of the passenger compartment, like the area in which a seated occupants legs would be received, or in a rearward area generally behind the normal seating area, such as a cargo area of the vehicle or another area behind the seat being moved. The seats 16, 106 can also be used as a partition or bulkhead between adjacent portions of the vehicle interior.

While the presently preferred implementations of the seats may achieve each of these positions and their stated advantages, it is not necessary that a seat assembly according to the present invention do so. Indeed, only certain preferred embodiments of the seat assembly have been shown and described, and persons of ordinary skill in this art will readily recognize that the preceding description has been set forth in terms of description rather than limitation, and that various modifications and substitutions can be made without departing from the spirit and scope of the invention. By way of example without limitation, the slide may include devices or structures other than the rails described to carry the seat 16, 106 for translational or sliding movement in the vehicle. By way of examples without limitations, the slide may also be a plate or tray that is slideably carried by the vehicle, or a rack and pinion arrangement or the like. Additionally, the seats 16 and 106 were shown and described as moving forward and rearward in the vehicle, but other movements including sideways, or at any angle or inclination may be employed, as desired. Of course, still other modifications and substitutions can be made. The invention is defined by the following claims.

We claim:

1. A seat assembly for a vehicle, comprising:
   a slide carried by the vehicle, including a first rail carried by the vehicle and a moveable portion including a second rail that is slidably moveable relative to the vehicle along the first rail;
   a seat carried by the second rail of the moveable portion for guided sliding movement of the seat and including a seat bottom and a seat back pivotally connected together for movement between an open position and a folded position; and
   a pivot connector connected to the movable portion and at least one of the seat bottom or seat back to permit pivoted movement of the seat relative to the slide.

2. The seat assembly of claim 1 wherein the slide includes a pair of first rails that are spaced apart and parallel, and a pair of second rails each slidably carried on a separate one of the first rails, and the pivot connector is connected to each of the second rails.

3. The seat assembly of claim 1 wherein the pivot connector is connected to the seat back.

4. The seat assembly of claim 1 which also includes a pivot connecting the seat back and the seat bottom, and the pivot connector is connected to the seat back at a location spaced from the pivot connecting the seat back and the seat bottom.

5. The seat assembly of claim 4 which also includes a frame of the seat bottom that has a bracket with a stop surface that engages the slide when the seat is in its open position to prevent pivoted movement of the seat bottom toward the seat back, and wherein the stop surface does not engage the slide when the seat back is pivoted sufficiently relative to the seat bottom so that the seat bottom may be pivoted toward the seat back to facilitate folding the seat.

6. The seat assembly of claim 1 wherein the pivot connector is connected to the seat bottom.

7. The seat assembly of claim 1 wherein the seat bottom includes a forward end spaced from the seat back and the pivot connector is connected to the seat bottom adjacent the forward end.

8. The seat assembly of claim 1 which also includes a leg pivotally connected to the seat bottom and adapted to engage a floor of the vehicle to support the seat bottom.

9. The seat assembly of claim 8 wherein the leg includes a roller adapted to engage the floor of the vehicle to facilitate movement of the leg relative to the floor.

10. The seat assembly of claim 8 which also includes a link interconnecting the leg and the seat back so that movement of the seat back toward the seat bottom pivots the leg from an extended position inclined relative to and supporting the seat bottom, to a retracted position generally parallel to the seat bottom.

11. The seat assembly of claim 10 which also includes a pivot connecting the seat back and the seat bottom and wherein the link is connected to the seat back at a location spaced from the pivot connecting the seat back and the seat bottom so that pivoted movement of the seat back pivots the leg relative to the seat bottom.

12. The seat assembly of claim 11 wherein the bracket is connected to the pivot connecting the seat back and the seat bottom, and movement of the seat back toward the seat bottom moves the pivot connecting the seat back and the seat bottom further from the slide and thereby moves the stop surface from the slide.

13. The seat assembly of claim 1 which also includes a head rest pivotally connected to the seat back, a lock that prevents pivoted movement of the seat back relative to the seat bottom when engaged, and a link interconnecting the head rest and the lock to release the lock when the head rest is pivoted toward the seat back to permit the seat back to move relative to the seat bottom.

14. The seat assembly of claim 1 which also comprises a lock associated with the seat back to releasably hold the seat back against pivoted movement, and a head rest pivotally connected to the seat back and coupled to the lock so that pivoted movement of the head rest from a first position to a second position releases the lock so that the seat back may be pivoted.

15. A vehicle, comprising:
    an interior including a forward area and a rearward area;
    a seat received in the interior and including a seat bottom and a seat back pivotally connected together;
    a slide that is carried by the vehicle for movement in the vehicle and which carries the seat to permit movement of the seat with the slide;
    a pivot connected to the seat back and to the slide to permit pivoted movement of the seat relative to the slide and into the forward area or rearward area of the interior.

16. The vehicle of claim 15 wherein the pivot is connected to the seat bottom.

17. The vehicle of claim 15 wherein the seat back may be moved to a folded position wherein the seat back is pivoted flat against the seat bottom, the forward area is lower than the rearward area by a first distance and a thickness of the seat when it is in its folded position is generally equal to the first distance so that when the seat is in its folded position and pivoted forward into the forward area, the seat is generally planar with the rearward area.

18. The vehicle of claim 15 wherein the seat may be moved to its folded position and pivoted into an upright position that provides a partition between the forward area and the rearward area.

19. The vehicle of claim 18 wherein the seat may be moved with the slide when it provides the partition to adjust the position of the partition relative to the forward and rearward areas.

20. The vehicle of claim 15 wherein the forward area includes a generally flat floor and the rearward area includes a generally flat floor and the seat may be pivoted to be received generally flat against the floor of either the forward area or the rearward area.

21. The vehicle of claim 15 which also comprises a passenger compartment including a floor and a plurality of seats disposed in the passenger compartment and wherein each seat may be moved to a folded position and may be pivoted into a position wherein the seats are generally flat against the passenger compartment floor to provide a generally flat surface in the vehicle.

* * * * *